United States Patent
Sowards et al.

(10) Patent No.: US 12,492,953 B2
(45) Date of Patent: Dec. 9, 2025

(54) ULTRASOUND PROBE WITH POINTER REMOTE CONTROL CAPABILITY

(71) Applicant: Bard Access Systems, Inc., Salt Lake City, UT (US)

(72) Inventors: Steffan Sowards, Salt Lake City, UT (US); Anthony K. Misener, Bountiful, UT (US); William Robert McLaughlin, Bountiful, UT (US)

(73) Assignee: Bard Access Systems, Inc., Salt Lake City, UT (US)

( * ) Notice: Subject to any disclaimer, the term of this patent is extended or adjusted under 35 U.S.C. 154(b) by 733 days.

(21) Appl. No.: 17/478,754

(22) Filed: Sep. 17, 2021

(65) Prior Publication Data

US 2022/0381630 A1    Dec. 1, 2022

Related U.S. Application Data

(60) Provisional application No. 63/080,546, filed on Sep. 18, 2020.

(51) Int. Cl.
  *G01L 1/24*  (2006.01)
  *G01L 1/26*  (2006.01)

(52) U.S. Cl.
  CPC ............... *G01L 1/246* (2013.01); *G01L 1/26* (2013.01)

(58) Field of Classification Search
  None
  See application file for complete search history.

(56) References Cited

U.S. PATENT DOCUMENTS

| 4,311,138 A | 1/1982 | Sugarman |
| 4,971,068 A | 11/1990 | Sahi |

(Continued)

FOREIGN PATENT DOCUMENTS

| AU | 2006201646 A1 | 11/2006 |
| CN | 114129137 B | 9/2022 |

(Continued)

OTHER PUBLICATIONS

Stolka, P.J., et al., (2014). Needle Guidance Using Handheld Stereo Vision and Projection for Ultrasound-Based Interventions. In: Galland, P., Hata, N., Barillot, C., Hornegger, J., Howe, R. (eds) Medical Image Computing and Computer-Assisted Intervention—MICCAI 2014. MICCAI 2014. (Year: 2014).

(Continued)

*Primary Examiner* — Chad H Smith
(74) *Attorney, Agent, or Firm* — Rutan & Tucker LLP (57) ABSTRACT

An ultrasound system is disclosed that includes an ultrasound imaging device including a display screen, a processor and memory having stored thereon logic, and an ultrasound probe. The logic of the ultrasound imaging device, upon execution by the processor, can causes an alteration of content displayed on the display screen in accordance of with ultrasound probe movement-related data. The ultrasound imaging device can include a light source configured to provide incident light to the optical fiber cable, the optical fiber cable including a plurality of reflective gratings disposed along a length thereof. Each of the plurality of reflective gratings can be configured to reflect light with different specific spectral widths to provide distributed measurements in accordance with strain applied to the optical fiber cable. The ultrasound imaging device can obtain the ultrasound probe movement-related data through an optical fiber.

18 Claims, 3 Drawing Sheets

(56) References Cited

U.S. PATENT DOCUMENTS

| | | |
|---|---|---|
| 5,148,809 A | 9/1992 | Biegeleisen-Knight et al. |
| 5,181,513 A | 1/1993 | Touboul et al. |
| 5,325,293 A | 6/1994 | Dorne |
| 5,441,052 A | 8/1995 | Miyajima |
| 5,549,554 A | 8/1996 | Miraki |
| 5,573,529 A | 11/1996 | Haak et al. |
| 5,775,322 A | 7/1998 | Silverstein et al. |
| 5,879,297 A | 3/1999 | Haynor et al. |
| 5,908,387 A | 6/1999 | LeFree et al. |
| 5,967,984 A | 10/1999 | Chu et al. |
| 5,970,119 A | 10/1999 | Hofmann |
| 6,004,270 A | 12/1999 | Urbano et al. |
| 6,019,724 A | 2/2000 | Gronningsaeter et al. |
| 6,068,599 A | 5/2000 | Saito et al. |
| 6,074,367 A | 6/2000 | Hubbell |
| 6,129,668 A | 10/2000 | Haynor et al. |
| 6,132,379 A | 10/2000 | Patacsil et al. |
| 6,216,028 B1 | 4/2001 | Haynor et al. |
| 6,233,476 B1 | 5/2001 | Strommer et al. |
| 6,245,018 B1 | 6/2001 | Lee |
| 6,263,230 B1 | 7/2001 | Haynor et al. |
| 6,375,615 B1 | 4/2002 | Flaherty et al. |
| 6,436,043 B2 | 8/2002 | Bonnefous |
| 6,498,942 B1 | 12/2002 | Esenaliev et al. |
| 6,503,205 B2 | 1/2003 | Manor et al. |
| 6,508,769 B2 | 1/2003 | Bonnefous |
| 6,511,458 B2 | 1/2003 | Milo et al. |
| 6,524,249 B2 | 2/2003 | Moehring et al. |
| 6,543,642 B1 | 4/2003 | Milliorn |
| 6,554,771 B1 | 4/2003 | Buil et al. |
| 6,592,520 B1 | 7/2003 | Peszynski et al. |
| 6,592,565 B2 | 7/2003 | Twardowski |
| 6,601,705 B2 | 8/2003 | Molina et al. |
| 6,612,992 B1 | 9/2003 | Hossack et al. |
| 6,613,002 B1 | 9/2003 | Clark et al. |
| 6,623,431 B1 | 9/2003 | Sakuma et al. |
| 6,641,538 B2 | 11/2003 | Nakaya et al. |
| 6,647,135 B2 | 11/2003 | Bonnefous |
| 6,687,386 B1 | 2/2004 | Ito et al. |
| 6,749,569 B1 | 6/2004 | Pellegretti |
| 6,754,608 B2 | 6/2004 | Svanerudh et al. |
| 6,755,789 B2 | 6/2004 | Stringer et al. |
| 6,840,379 B2 | 1/2005 | Franks-Farah et al. |
| 6,857,196 B2 | 2/2005 | Dalrymple |
| 6,979,294 B1 | 12/2005 | Selzer et al. |
| 7,074,187 B2 | 7/2006 | Selzer et al. |
| 7,244,234 B2 | 7/2007 | Ridley et al. |
| 7,359,554 B2 | 4/2008 | Klingensmith et al. |
| 7,534,209 B2 | 5/2009 | Abend et al. |
| 7,599,730 B2 | 10/2009 | Hunter et al. |
| 7,637,870 B2 | 12/2009 | Flaherty et al. |
| 7,681,579 B2 | 3/2010 | Schwartz |
| 7,691,061 B2 | 4/2010 | Hirota |
| 7,699,779 B2 | 4/2010 | Sasaki et al. |
| 7,720,520 B2 | 5/2010 | Willis |
| 7,727,153 B2 | 6/2010 | Fritz et al. |
| 7,734,326 B2 | 6/2010 | Pedain et al. |
| 7,831,449 B2 | 11/2010 | Ying et al. |
| 7,905,837 B2 | 3/2011 | Suzuki |
| 7,925,327 B2 | 4/2011 | Weese |
| 7,927,278 B2 | 4/2011 | Selzer et al. |
| 8,014,848 B2 | 9/2011 | Birkenbach et al. |
| 8,050,523 B2 | 11/2011 | Younge et al. |
| 8,060,181 B2 | 11/2011 | Rodriguez Ponce et al. |
| 8,068,581 B2 | 11/2011 | Boese et al. |
| 8,075,488 B2 | 12/2011 | Burton |
| 8,090,427 B2 | 1/2012 | Eck et al. |
| 8,105,239 B2 | 1/2012 | Specht |
| 8,172,754 B2 | 5/2012 | Watanabe et al. |
| 8,175,368 B2 | 5/2012 | Sathyanarayana |
| 8,200,313 B1 | 6/2012 | Rambod et al. |
| 8,211,023 B2 | 7/2012 | Swan et al. |
| 8,228,347 B2 | 7/2012 | Beasley et al. |
| 8,298,147 B2 | 10/2012 | Huennekens et al. |
| 8,303,505 B2 | 11/2012 | Webler et al. |
| 8,323,202 B2 | 12/2012 | Roschak et al. |
| 8,328,727 B2 | 12/2012 | Miele et al. |
| 8,388,541 B2 | 3/2013 | Messerly et al. |
| 8,409,103 B2 | 4/2013 | Grunwald et al. |
| 8,449,465 B2 | 5/2013 | Nair et al. |
| 8,553,954 B2 | 10/2013 | Saikia |
| 8,556,815 B2 | 10/2013 | Pelissier et al. |
| 8,585,600 B2 | 11/2013 | Liu et al. |
| 8,622,913 B2 | 1/2014 | Dentinger et al. |
| 8,706,457 B2 | 4/2014 | Hart et al. |
| 8,727,988 B2 | 5/2014 | Flaherty et al. |
| 8,734,357 B2 | 5/2014 | Taylor |
| 8,744,211 B2 | 6/2014 | Owen |
| 8,754,865 B2 | 6/2014 | Merritt et al. |
| 8,764,663 B2 | 7/2014 | Smok et al. |
| 8,781,194 B2 | 7/2014 | Malek et al. |
| 8,781,555 B2 | 7/2014 | Burnside et al. |
| 8,790,263 B2 | 7/2014 | Randall et al. |
| 8,849,382 B2 | 9/2014 | Cox et al. |
| 8,939,908 B2 | 1/2015 | Suzuki et al. |
| 8,961,420 B2 | 2/2015 | Zhang |
| 9,022,940 B2 | 5/2015 | Meier |
| 9,138,290 B2 | 9/2015 | Hadjicostis |
| 9,155,517 B2 | 10/2015 | Dunbar et al. |
| 9,204,858 B2 | 12/2015 | Pelissier et al. |
| 9,220,477 B2 | 12/2015 | Urabe et al. |
| 9,257,220 B2 | 2/2016 | Nicholls et al. |
| 9,295,447 B2 | 3/2016 | Shah |
| 9,320,493 B2 | 4/2016 | Visveshwara |
| 9,357,980 B2 | 6/2016 | Toji et al. |
| 9,364,171 B2 | 6/2016 | Harris et al. |
| 9,427,207 B2 | 8/2016 | Sheldon et al. |
| 9,445,780 B2 | 9/2016 | Jossack et al. |
| 9,456,766 B2 | 10/2016 | Cox et al. |
| 9,456,804 B2 | 10/2016 | Tamada |
| 9,459,087 B2 | 10/2016 | Dunbar et al. |
| 9,468,413 B2 | 10/2016 | Hall et al. |
| 9,492,097 B2 | 11/2016 | Wilkes et al. |
| 9,521,961 B2 | 12/2016 | Silverstein et al. |
| 9,554,716 B2 | 1/2017 | Burnside et al. |
| 9,582,876 B2 | 2/2017 | Specht |
| 9,597,008 B2 | 3/2017 | Henkel et al. |
| 9,610,061 B2 | 4/2017 | Ebbini et al. |
| 9,636,031 B2 | 5/2017 | Cox |
| 9,649,037 B2 | 5/2017 | Lowe et al. |
| 9,649,048 B2 | 5/2017 | Cox et al. |
| 9,702,969 B2 | 7/2017 | Hope Simpson et al. |
| 9,715,757 B2 | 7/2017 | Ng et al. |
| 9,717,415 B2 | 8/2017 | Cohen et al. |
| 9,731,066 B2 | 8/2017 | Liu et al. |
| 9,814,433 B2 | 11/2017 | Benishti et al. |
| 9,814,531 B2 | 11/2017 | Yagi et al. |
| 9,861,337 B2 | 1/2018 | Patwardhan et al. |
| 9,895,138 B2 | 2/2018 | Sasaki |
| 9,913,605 B2 | 3/2018 | Harris et al. |
| 9,949,720 B2 | 4/2018 | Southard et al. |
| 10,010,379 B1 | 7/2018 | Gibby et al. |
| 10,043,272 B2 | 8/2018 | Forzoni et al. |
| 10,380,919 B2 | 8/2019 | Savitsky et al. |
| 10,380,920 B2 | 8/2019 | Savitsky et al. |
| 10,424,225 B2 | 9/2019 | Nataneli et al. |
| 10,434,278 B2 | 10/2019 | Dunbar et al. |
| 10,449,330 B2 | 10/2019 | Newman et al. |
| 10,524,691 B2 | 1/2020 | Newman et al. |
| 10,636,323 B2 | 4/2020 | Buras et al. |
| 10,674,935 B2 | 6/2020 | Henkel et al. |
| 10,751,509 B2 | 8/2020 | Misener |
| 10,758,155 B2 | 9/2020 | Henkel et al. |
| 10,765,343 B2 | 9/2020 | Henkel et al. |
| 10,796,605 B2 | 10/2020 | Buras et al. |
| 10,818,199 B2 | 10/2020 | Buras et al. |
| 10,869,727 B2 | 12/2020 | Yanof et al. |
| 10,896,628 B2 | 1/2021 | Savitsky et al. |
| 11,011,078 B2 | 5/2021 | Buras et al. |
| 11,017,694 B2 | 5/2021 | Buras et al. |
| 11,017,695 B2 | 5/2021 | Buras et al. |
| 11,062,624 B2 | 7/2021 | Savitsky et al. |
| 11,120,709 B2 | 9/2021 | Savitsky et al. |
| 11,311,269 B2 | 4/2022 | Dunbar et al. |

(56) References Cited

U.S. PATENT DOCUMENTS

| | | |
|---|---|---|
| 11,315,439 B2 | 4/2022 | Savitsky et al. |
| 11,495,142 B2 | 11/2022 | Petrinec et al. |
| 11,600,201 B1 | 3/2023 | Savitsky et al. |
| 11,676,513 B2 | 6/2023 | Buras et al. |
| 12,062,297 B2 | 8/2024 | Buras et al. |
| 12,144,675 B2 | 11/2024 | Durfee |
| 12,396,656 B2 | 8/2025 | Durfee et al. |
| 12,414,835 B2 | 9/2025 | Gibby et al. |
| 2002/0038088 A1 | 3/2002 | Imran et al. |
| 2002/0148277 A1 | 10/2002 | Umeda |
| 2003/0028112 A1 | 2/2003 | Paladini et al. |
| 2003/0047126 A1 | 3/2003 | Tomaschko |
| 2003/0060714 A1 | 3/2003 | Henderson et al. |
| 2003/0073900 A1 | 4/2003 | Senarith et al. |
| 2003/0093001 A1 | 5/2003 | Martikainen |
| 2003/0106825 A1 | 6/2003 | Molina et al. |
| 2003/0120154 A1 | 6/2003 | Sauer et al. |
| 2004/0055925 A1 | 3/2004 | Franks-Farah et al. |
| 2005/0000975 A1 | 1/2005 | Carco et al. |
| 2005/0049504 A1 | 3/2005 | Lo et al. |
| 2005/0165299 A1 | 7/2005 | Kressy et al. |
| 2005/0251030 A1 | 11/2005 | Azar et al. |
| 2005/0267365 A1 | 12/2005 | Sokulin et al. |
| 2006/0013523 A1 | 1/2006 | Childlers et al. |
| 2006/0015039 A1 | 1/2006 | Cassidy et al. |
| 2006/0020204 A1 | 1/2006 | Serra et al. |
| 2006/0079781 A1 | 4/2006 | Germond-Rouet et al. |
| 2006/0184029 A1 | 8/2006 | Haim et al. |
| 2006/0210130 A1 | 9/2006 | Germond-Rouet et al. |
| 2007/0043341 A1 | 2/2007 | Anderson et al. |
| 2007/0049822 A1 | 3/2007 | Bunce et al. |
| 2007/0073155 A1 | 3/2007 | Park et al. |
| 2007/0199848 A1 | 8/2007 | Ellswood et al. |
| 2007/0239120 A1 | 10/2007 | Brock et al. |
| 2007/0249911 A1 | 10/2007 | Simon |
| 2008/0021322 A1 | 1/2008 | Stone et al. |
| 2008/0033293 A1 | 2/2008 | Beasley et al. |
| 2008/0033759 A1 | 2/2008 | Finlay |
| 2008/0051657 A1 | 2/2008 | Rold |
| 2008/0146915 A1 | 6/2008 | McMorrow |
| 2008/0177186 A1 | 7/2008 | Slater et al. |
| 2008/0221425 A1 | 9/2008 | Olson et al. |
| 2008/0255475 A1 | 10/2008 | Kondrosky et al. |
| 2008/0294037 A1 | 11/2008 | Richter |
| 2008/0300491 A1 | 12/2008 | Bonde et al. |
| 2009/0012399 A1 | 1/2009 | Sunagawa et al. |
| 2009/0143672 A1 | 6/2009 | Harms et al. |
| 2009/0143684 A1 | 6/2009 | Cermak et al. |
| 2009/0156926 A1 | 6/2009 | Messerly et al. |
| 2009/0306509 A1 | 12/2009 | Pedersen et al. |
| 2010/0020926 A1 | 1/2010 | Boese et al. |
| 2010/0106015 A1 | 4/2010 | Norris |
| 2010/0160786 A1* | 6/2010 | Nordgren ............... A61B 8/00 600/459 |
| 2010/0179428 A1 | 7/2010 | Pedersen et al. |
| 2010/0211026 A2 | 8/2010 | Sheetz et al. |
| 2010/0277305 A1* | 11/2010 | Garner ............... A61B 8/4438 340/539.1 |
| 2010/0286515 A1 | 11/2010 | Gravenstein et al. |
| 2010/0312121 A1 | 12/2010 | Guan |
| 2011/0002518 A1 | 1/2011 | Ziv-Ari et al. |
| 2011/0071404 A1 | 3/2011 | Schmitt et al. |
| 2011/0166451 A1 | 7/2011 | Blaivas et al. |
| 2011/0288405 A1 | 11/2011 | Razavi et al. |
| 2011/0295108 A1 | 12/2011 | Cox et al. |
| 2011/0313293 A1 | 12/2011 | Lindekugel et al. |
| 2012/0136242 A1 | 5/2012 | Qi et al. |
| 2012/0179038 A1 | 7/2012 | Meurer et al. |
| 2012/0197132 A1 | 8/2012 | O'Connor |
| 2012/0209121 A1 | 8/2012 | Boudier |
| 2012/0220865 A1 | 8/2012 | Brown et al. |
| 2012/0238875 A1 | 9/2012 | Savitsky et al. |
| 2012/0277576 A1 | 11/2012 | Lui |
| 2013/0041250 A1 | 2/2013 | Pelissier et al. |
| 2013/0102889 A1 | 4/2013 | Southard et al. |
| 2013/0131499 A1* | 5/2013 | Chan ............... A61B 8/0841 600/424 |
| 2013/0131502 A1 | 5/2013 | Blaivas et al. |
| 2013/0150724 A1 | 6/2013 | Blaivas et al. |
| 2013/0188832 A1 | 7/2013 | Ma et al. |
| 2013/0218024 A1 | 8/2013 | Boctor et al. |
| 2013/0324840 A1 | 12/2013 | Zhongping et al. |
| 2014/0005530 A1 | 1/2014 | Liu et al. |
| 2014/0031690 A1 | 1/2014 | Toji et al. |
| 2014/0036091 A1 | 2/2014 | Zalev et al. |
| 2014/0073976 A1 | 3/2014 | Fonte et al. |
| 2014/0100440 A1 | 4/2014 | Cheline et al. |
| 2014/0155737 A1 | 6/2014 | Manzke et al. |
| 2014/0180098 A1 | 6/2014 | Flaherty et al. |
| 2014/0187920 A1 | 7/2014 | Millett et al. |
| 2014/0188133 A1 | 7/2014 | Misener |
| 2014/0188440 A1 | 7/2014 | Donhowe et al. |
| 2014/0257104 A1 | 9/2014 | Dunbar et al. |
| 2014/0276059 A1 | 9/2014 | Sheehan |
| 2014/0276081 A1 | 9/2014 | Tegels |
| 2014/0276085 A1 | 9/2014 | Miller |
| 2014/0276690 A1 | 9/2014 | Grace |
| 2014/0343431 A1 | 11/2014 | Vajinepalli et al. |
| 2015/0005738 A1 | 1/2015 | Blacker |
| 2015/0011887 A1 | 1/2015 | Ahn et al. |
| 2015/0065916 A1 | 3/2015 | Maguire et al. |
| 2015/0073279 A1 | 3/2015 | Cai et al. |
| 2015/0112200 A1 | 4/2015 | Oberg et al. |
| 2015/0157295 A1* | 6/2015 | Liu ............... A61B 8/467 600/440 |
| 2015/0209113 A1 | 7/2015 | Burkholz et al. |
| 2015/0209526 A1 | 7/2015 | Matsubara et al. |
| 2015/0294497 A1 | 10/2015 | Ng et al. |
| 2015/0297097 A1 | 10/2015 | Matsubara et al. |
| 2015/0305718 A1 | 10/2015 | Ogasawara |
| 2015/0327841 A1 | 11/2015 | Banjanin et al. |
| 2015/0359991 A1 | 12/2015 | Dunbar et al. |
| 2016/0029995 A1 | 2/2016 | Navratil et al. |
| 2016/0029998 A1 | 2/2016 | Brister et al. |
| 2016/0058420 A1 | 3/2016 | Cinthio et al. |
| 2016/0100970 A1 | 4/2016 | Brister et al. |
| 2016/0101263 A1 | 4/2016 | Blumenkranz et al. |
| 2016/0113699 A1 | 4/2016 | Sverdlik et al. |
| 2016/0120607 A1 | 5/2016 | Sorotzkin et al. |
| 2016/0143622 A1 | 5/2016 | Xie et al. |
| 2016/0157808 A1 | 6/2016 | Merritt et al. |
| 2016/0166232 A1 | 6/2016 | Merritt |
| 2016/0202053 A1 | 7/2016 | Walker et al. |
| 2016/0213398 A1 | 7/2016 | Liu |
| 2016/0278743 A1 | 9/2016 | Kawashima |
| 2016/0278869 A1 | 9/2016 | Grunwald |
| 2016/0296208 A1 | 10/2016 | Sethuraman et al. |
| 2016/0374644 A1 | 12/2016 | Mauldin, Jr. et al. |
| 2017/0056062 A1 | 3/2017 | Buljubasic |
| 2017/0079548 A1 | 3/2017 | Silverstein et al. |
| 2017/0086785 A1 | 3/2017 | Bjaerum |
| 2017/0100092 A1 | 4/2017 | Kruse et al. |
| 2017/0164923 A1 | 6/2017 | Matsumoto |
| 2017/0172424 A1 | 6/2017 | Eggers et al. |
| 2017/0188839 A1 | 7/2017 | Tashiro |
| 2017/0196535 A1 | 7/2017 | Arai et al. |
| 2017/0215842 A1 | 8/2017 | Ryu et al. |
| 2017/0259013 A1 | 9/2017 | Boyden et al. |
| 2017/0265840 A1 | 9/2017 | Bharat et al. |
| 2017/0303894 A1 | 10/2017 | Scully |
| 2017/0367678 A1 | 12/2017 | Sirtori et al. |
| 2018/0015256 A1 | 1/2018 | Southard et al. |
| 2018/0116723 A1 | 5/2018 | Hettrick et al. |
| 2018/0125450 A1 | 5/2018 | Blackbourne et al. |
| 2018/0161502 A1 | 6/2018 | Nanan et al. |
| 2018/0199914 A1 | 7/2018 | Ramachandran et al. |
| 2018/0214119 A1 | 8/2018 | Mehrmohammadi et al. |
| 2018/0220993 A1* | 8/2018 | Poland ............... A61B 8/56 |
| 2018/0225993 A1 | 8/2018 | Buras et al. |
| 2018/0228465 A1 | 8/2018 | Southard et al. |
| 2018/0235576 A1 | 8/2018 | Brannan |
| 2018/0250078 A1 | 9/2018 | Shochat et al. |
| 2018/0272108 A1 | 9/2018 | Padilla et al. |
| 2018/0279996 A1 | 10/2018 | Cox et al. |

(56) References Cited

U.S. PATENT DOCUMENTS

| | | |
|---|---|---|
| 2018/0286287 A1 | 10/2018 | Razzaque |
| 2018/0310955 A1 | 11/2018 | Lindekugel et al. |
| 2018/0317881 A1 | 11/2018 | Astigarraga et al. |
| 2018/0366035 A1 | 12/2018 | Dunbar et al. |
| 2019/0060014 A1 | 2/2019 | Hazelton et al. |
| 2019/0069923 A1 | 3/2019 | Wang |
| 2019/0076121 A1 | 3/2019 | Southard et al. |
| 2019/0088019 A1 | 3/2019 | Prevrhal et al. |
| 2019/0105017 A1 | 4/2019 | Hastings |
| 2019/0117190 A1 | 4/2019 | Djajadiningrat et al. |
| 2019/0167148 A1 | 6/2019 | Durfee et al. |
| 2019/0223757 A1 | 7/2019 | Durfee |
| 2019/0239850 A1 | 8/2019 | Dalvin et al. |
| 2019/0282324 A1 | 9/2019 | Freeman et al. |
| 2019/0298457 A1 | 10/2019 | Bharat |
| 2019/0307419 A1 | 10/2019 | Durfee |
| 2019/0307516 A1 | 10/2019 | Schotzko et al. |
| 2019/0339525 A1 | 11/2019 | Yanof et al. |
| 2019/0355278 A1 | 11/2019 | Sainsbury et al. |
| 2019/0365348 A1 | 12/2019 | Toume et al. |
| 2020/0041261 A1 | 2/2020 | Bernstein et al. |
| 2020/0069285 A1 | 3/2020 | Annangi et al. |
| 2020/0069929 A1 | 3/2020 | Mason et al. |
| 2020/0113540 A1 | 4/2020 | Gijsbers et al. |
| 2020/0129136 A1 | 4/2020 | Harding et al. |
| 2020/0188028 A1 | 6/2020 | Feiner et al. |
| 2020/0230391 A1 | 7/2020 | Burkholz et al. |
| 2020/0367860 A1 | 11/2020 | Rouet et al. |
| 2021/0007710 A1 | 1/2021 | Douglas |
| 2021/0045716 A1 | 2/2021 | Shiran et al. |
| 2021/0161612 A1 | 6/2021 | Black et al. |
| 2021/0166583 A1 | 6/2021 | Buras et al. |
| 2021/0307838 A1 | 10/2021 | Xia et al. |
| 2021/0327303 A1 | 10/2021 | Buras et al. |
| 2021/0353255 A1 | 11/2021 | Schneider et al. |
| 2021/0402144 A1 | 12/2021 | Messerly |
| 2022/0022969 A1 | 1/2022 | Misener |
| 2022/0031965 A1 | 2/2022 | Durfee |
| 2022/0039685 A1 | 2/2022 | Misener et al. |
| 2022/0039777 A1 | 2/2022 | Durfee |
| 2022/0096797 A1 | 3/2022 | Prince |
| 2022/0104886 A1 | 4/2022 | Blanchard et al. |
| 2022/0117582 A1 | 4/2022 | McLaughlin et al. |
| 2022/0160434 A1 | 5/2022 | Messerly et al. |
| 2022/0168050 A1 | 6/2022 | Sowards et al. |
| 2022/0172354 A1 | 6/2022 | Misener et al. |
| 2022/0211442 A1 | 7/2022 | McLaughlin et al. |
| 2022/0354462 A1 | 11/2022 | Southworth et al. |
| 2022/0401157 A1 | 12/2022 | Sowards et al. |
| 2023/0053189 A1 | 2/2023 | Geric et al. |
| 2023/0113291 A1 | 4/2023 | De Wild et al. |
| 2023/0240643 A1 | 8/2023 | Cermak et al. |
| 2023/0389893 A1 | 12/2023 | Misener et al. |
| 2024/0008929 A1 | 1/2024 | Misener et al. |
| 2024/0050061 A1 | 2/2024 | McLaughlin et al. |
| 2024/0058074 A1 | 2/2024 | Misener |
| 2024/0062678 A1 | 2/2024 | Sowards et al. |
| 2025/0000488 A1 | 1/2025 | Misener et al. |
| 2025/0032152 A1 | 1/2025 | Miller et al. |
| 2025/0057604 A1 | 2/2025 | Blanchard et al. |
| 2025/0064425 A1 | 2/2025 | Durfee |
| 2025/0143804 A1 | 5/2025 | Misener |
| 2025/0176942 A1 | 6/2025 | McLaughlin et al. |

FOREIGN PATENT DOCUMENTS

| | | |
|---|---|---|
| EP | 0933063 A1 | 8/1999 |
| EP | 1504713 A1 | 2/2005 |
| EP | 1591074 B1 | 5/2008 |
| EP | 3181083 A1 | 6/2017 |
| EP | 3530221 A1 | 8/2019 |
| JP | 2000271136 A | 10/2000 |
| JP | 2014150928 A | 8/2014 |
| JP | 2018175547 A | 11/2018 |
| KR | 20180070878 A | 6/2018 |
| KR | 20190013133 A | 2/2019 |
| KR | 20220141308 A | 10/2022 |
| WO | 2013059714 A1 | 4/2013 |
| WO | 2014/115150 A1 | 7/2014 |
| WO | 2014174305 A2 | 10/2014 |
| WO | 2015/017270 A1 | 2/2015 |
| WO | 2017096487 A1 | 6/2017 |
| WO | 2017214428 A1 | 12/2017 |
| WO | 2018/026878 A1 | 2/2018 |
| WO | 2018134726 A1 | 7/2018 |
| WO | 2018206473 A1 | 11/2018 |
| WO | 2019/232451 A1 | 12/2019 |
| WO | 2020/002620 A1 | 1/2020 |
| WO | 2020/016018 A1 | 1/2020 |
| WO | 2019/232454 A9 | 2/2020 |
| WO | 2020/044769 A1 | 3/2020 |
| WO | 2020102665 A1 | 5/2020 |
| WO | 2020/186198 A1 | 9/2020 |
| WO | 2022/031762 A1 | 2/2022 |
| WO | 2022/072727 A2 | 4/2022 |
| WO | 2022/081904 A1 | 4/2022 |
| WO | 2022-203713 A2 | 9/2022 |
| WO | 2022263763 A1 | 12/2022 |
| WO | 2023235435 A1 | 12/2023 |
| WO | 2024010940 A1 | 1/2024 |
| WO | 2024039608 A1 | 2/2024 |
| WO | 2024039719 A1 | 2/2024 |
| WO | 2025024821 A1 | 1/2025 |

OTHER PUBLICATIONS

U.S. Appl. No. 17/491,308, filed Sep. 30, 2021 Non-Final Office Action dated Jun. 5, 2023.

U.S. Appl. No. 17/501,909, filed Oct. 14, 2021 Non-Final Office Action dated Jun. 6, 2023.

U.S. Appl. No. 17/832,389, filed Jun. 3, 2022 Restriction Requirement dated Jul. 13, 2023.

U.S. Appl. No. 17/380,767, filed Jul. 20, 2021 Non-Final Office Action dated Mar. 6, 2023.

U.S. Appl. No. 17/393,283, filed Aug. 3, 2021 Non-Final Office Action dated Mar. 31, 2023.

U.S. Appl. No. 17/491,308, filed Sep. 30, 2021 Restriction Requirement dated Feb. 27, 2023.

PCT/US2023/030160 filed Aug. 14, 2023 International Search Report and Written Opinion dated Oct. 23, 2023.

PCT/US2023/030347 filed Aug. 16, 2023 International Search Report and Written Opinion dated Nov. 6, 2023.

Practical guide for safe central venous catheterization and management 2017 Journal of Anesthesia vol. 34 published online Nov. 30, 2019 pp. 167-186.

U.S. Appl. No. 17/393,283, filed Aug. 3, 2021 Advisory Action dated Jan. 19, 2024.

U.S. Appl. No. 17/393,283, filed Aug. 3, 2021 Non-Final Office Action dated Feb. 29, 2024.

U.S. Appl. No. 17/397,486, filed Aug. 9, 2021 Non-Final Office Action dated Mar. 1, 2024.

U.S. Appl. No. 17/501,909, filed Oct. 14, 2021 Advisory Action dated Jan. 24, 2024.

U.S. Appl. No. 17/501,909, filed Oct. 14, 2021 Final Office Action dated Nov. 21, 2023.

U.S. Appl. No. 17/832,389, filed Jun. 3, 2022 Final Office Action dated Jan. 25, 2024.

eZono, eZSimulator, https://www.ezono.com/en/ezsimulator/, last accessed Sep. 13, 2022.

Ikhsan Mohammad et al: "Assistive technology for ultrasound-guided central venous catheter placement", Journal of Medical Ultrasonics, Japan Society of Ultrasonics in Medicine, Tokyo, JP, vol. 45, No. 1, Apr. 19, 2017, pp. 41-57, KPO36387340, ISSN: 1346-4523, DOI: 10.1007/S10396-017-0789-2 [retrieved on Apr. 19, 2017].

Lu Zhenyu et al "Recent advances in 5 robot-assisted echography combining perception control and cognition." Cognitive Computation and Systems the Institution of Engineering and Technology, (56) References Cited

OTHER PUBLICATIONS

Michael Faraday House, Six Hills Way, Stevenage Herts. SG1 2AY UK vol. 2 No. 3 Sep. 2, 2020 (Sep. 2, 2020).
Pagoulatos, N. et al. "New spatial localizer based on fiber optics with applications in 3D ultrasound imaging" Proceeding of Spie, vol. 3976 (Apr. 18, 2000; Apr. 18, 2000).
PCT/US2021/042369 filed Jul. 20, 2021 International Search Report and Written Opinion dated Oct. 25, 2021.
PCT/US2021/044419 filed Aug. 3, 2021 International Search Report and Written Opinion dated Nov. 19, 2021.
PCT/US2021/045218 filed Aug. 9, 2021 International Search Report and Written Opinion dated Nov. 23, 2021.
PCT/US2021/053018 filed Sep. 30, 2021 International Search Report and Written Opinion dated May 3, 2022.
PCT/US2021/055076 filed Oct. 14, 2021 International Search Report and Written Opinion dated Mar. 25, 2022.
Sebastian Vogt: "Real-Time Augmented Reality for Image-Guided Interventions", Oct. 5, 2009, XPO55354720, Retrieved from the Internet: URL: https://opus4.kobv.de/opus4-fau/frontdoor/deliver/index/docId/1235/file/SebastianVogtDissertation.pdf.
Sonosim, https://sonosim.com/ultrasound-simulation/? last accessed Sep. 13, 2022.
U.S. Appl. No. 17/397,486, filed Aug. 9, 2021 Restriction Requirement dated Aug. 12, 2022.
William F Garrett et al: "Real-time incremental visualization of dynamic ultrasound vols. using parallel BSP trees", Visualization '96. Proceedings, IEEE, NE, Oct. 27, 1996, pp. 235-ff, XPO58399771, ISBN: 978-0-89791-864-0 abstract, figures 1-7, pp. 236-240.
PCT/US2021/050973 filed Sep. 17, 2021 International Search Report and Written Opinion dated Nov. 7, 2022.
U.S. Appl. No. 17/380,767, filed Jul. 20, 2021 Restriction Requirement dated Dec. 15, 2022.
U.S. Appl. No. 17/393,283, filed Aug. 3, 2021 Restriction Requirement dated Jan. 12, 2023.
U.S. Appl. No. 17/397,486, filed Aug. 9, 2021 Non-Final Office Action dated Jan. 23, 2023.
U.S. Appl. No. 17/501,909, filed Oct. 14, 2021 Restriction Requirement dated Feb. 1, 2023.
PCT/US2023/024067 filed May 31, 2023 International Search Report and Written Opinion dated Sep. 15, 2023.
PCT/US2023/027147 filed Jul. 7, 2023 International Search Report and Written Opinion dated Oct. 2, 2023.
State, A., et al. (Aug. 1996). Technologies for augmented reality systems: Realizing ultrasound-guided needle biopsies. In Proceedings of the 23rd annual conference on computer graphics and interactive techniques (pp. 439-446) (Year: 1996).
U.S. Appl. No. 17/380,767, filed Jul. 20, 2021 Notice of Allowance dated Aug. 31, 2023.
U.S. Appl. No. 17/393,283, filed Aug. 3, 2021 Final Office Action dated Oct. 16, 2023.
U.S. Appl. No. 17/397,486, filed Aug. 9, 2021 Advisory Action dated Oct. 5, 2023.
U.S. Appl. No. 17/397,486, filed Aug. 9, 2021 Final Office Action dated Aug. 4, 2023.
U.S. Appl. No. 17/491,308, filed Sep. 30, 2021 Board Decison dated Oct. 25, 2023.
U.S. Appl. No. 17/491,308, filed Sep. 30, 2021 Final Office Action dated Aug. 29, 2023.
U.S. Appl. No. 17/832,389, filed Jun. 3, 2022 Non-Final Office Action dated Oct. 6, 2023.
U.S. Appl. No. 17/861,031, filed Jul. 8, 2022 Non-Final Office Action dated Sep. 14, 2023.
U.S. Appl. No. 17/393,283, filed Aug. 3, 2021 Notice of Allowance dated Sep. 18, 2024.
U.S. Appl. No. 17/397,486, filed Aug. 9, 2021 Notice of Allowance dated Jul. 10, 2024.
U.S. Appl. No. 17/491,308, filed Sep. 30, 2021 Non-Final Office Action dated Mar. 22, 2024.
U.S. Appl. No. 17/491,308, filed Sep. 30, 2021 Notice of Allowance dated Jun. 27, 2024.
U.S. Appl. No. 17/501,909, filed Oct. 14, 2021 Final Office Action dated Aug. 5, 2024.
U.S. Appl. No. 17/501,909, filed Oct. 14, 2021 Non-Final Office Action dated Mar. 21, 2024.
U.S. Appl. No. 17/501,909, filed Oct. 14, 2021 Notice of Allowance dated Sep. 25, 2024.
U.S. Appl. No. 17/832,389, filed Jun. 3, 2022 Advisory Action dated Apr. 4, 2024.
U.S. Appl. No. 17/832,389, filed Jun. 3, 2022 Notice of Allowance dated May 15, 2024.
U.S. Appl. No. 17/861,031, filed Jul. 8, 2022 Advisory Action dated Jun. 7, 2024.
U.S. Appl. No. 17/861,031, filed Jul. 8, 2022 Final Office Action dated Mar. 15, 2024.
U.S. Appl. No. 17/861,031, filed Jul. 8, 2022 Notice of Allowance dated Jul. 3, 2024.
U.S. Appl. No. 17/888,359, filed Aug. 15, 2022 Restriction Requirement dated Sep. 5, 2024.
U.S. Appl. No. 18/385,101 filed Oct. 30, 2023 Notice of Allowance dated Aug. 20, 2024.
PCT/US2024/039922 filed Jul. 26, 2024 International Search Report and Written Opinion dated Jan. 9, 2025.
U.S. Appl. No. 17/888,359, filed Aug. 15, 2022 Non-Final Office Action dated Feb. 12, 2025.
U.S. Appl. No. 17/888,359, filed Aug. 15, 2022 Final Office Action dated Jun. 18, 2025.
Manuel Birlo et al: "Utility of Optical See-Through Head Mounted Displays in Augmented Reality-Assisted Surgery: A systematic review", arxiv.org, Cornell University Library, 201 Olin Library Cornell University Ithaca, NY 14853, Feb. 8, 2022 (Feb. 8, 2022), XP091157128, DOI: 10.1016/J. MEDIA.2022.102361 Section 8.5, section 8.2.
PCT/US2025/027390 filed May 1, 2025 International Search Report and Written Opinion dated Jul. 29, 2025.
U.S. Appl. No. 17/888,359, filed Aug. 15, 2022 Advisory Action dated Sep. 3, 2025.
U.S. Appl. No. 17/888,359, filed Aug. 15, 2022 Notice of Allowance dated Oct. 21, 2025.
U.S. Appl. No. 17/890,148 filed Aug. 17, 2022 Non-Final Office Action dated Sep. 9, 2025.
U.S. Appl. No. 18/652,728, filed May 1, 2024 Non-Final Office Action dated Oct. 1, 2025.
U.S. Appl. No. 18/885,090, filed Sep. 13, 2024 Non-Final Office Action dated Sep. 29, 2025.

\* cited by examiner

ULTRASOUND PROBE WITH POINTER REMOTE CONTROL CAPABILITY

PRIORITY

This application claims the benefit of priority to U.S. Provisional Application No. 63/080,546, filed Sep. 18, 2020, which is incorporated by reference in its entirety into this application.

BACKGROUND

There are currently a range of existing ultrasound systems that include wired ultrasound probes connected to visual displays and wireless probes that communicate with visual displays remotely. These systems may be used by a clinician to move the ultrasound probe on a skip surface of a patient to acquire ultrasound images from a patient. The ultrasound images are displayed on a screen of an image processing device (or "console") of a medical/ultrasound computer system. An ultrasound clinician has to be in physical contact with the medical/ultrasound computer to control images, make annotations, save images, and etc. Also, the clinician may have to move back and forth between the patient and the ultrasound computer in order to work with the images. While this approach is commonly used, it does not provide for an appropriate sterile use of the equipment and does not provide for the sterile use of the ultrasound computer mid-procedure.

Disclosed herein is an ultrasound probe system configured with a pointer remote control capability to enable a single user to control an image processing device from within a sterile field mid-procedure.

SUMMARY OF THE INVENTION

Briefly summarized, disclosed herein is an ultrasound probe system with a pointer remote control capability that enables a single user to control an image processing device from within a sterile field mid-procedure. A user of the ultrasound probe such as a clinician may remotely control a content displayed on a display of the image processing device by movements of the ultrasound probe (e.g., control movement and activation of a screen pointer). The ultrasound probe has movement detection utilities that provide movement data to a processor which converts the movement data into control movements of a screen pointer of the image processing device.

Disclosed herein is an ultrasound system including an ultrasound imaging device including a display screen, a processor and non-transitory, computer-readable medium having stored thereon logic and an ultrasound probe operatively connected to the ultrasound imaging device, wherein the logic of the ultrasound imaging device, upon execution by the processor, causes an alteration of content displayed on the display screen in accordance of with ultrasound probe movement-related data.

In some embodiments, the ultrasound probe enables a user to control the ultrasound imaging device from within a sterile field. In other embodiments, the ultrasound probe is wirelessly connected to the ultrasound imaging device to render ultrasound images on the screen of the ultrasound imaging device.

In some embodiments, the ultrasound imaging device is configured to acquire the ultrasound probe movement-related data from at least one accelerometer integrated into the ultrasound probe. In some embodiments, the ultrasound imaging device is configured to obtain the ultrasound probe movement-related data through an optical fiber cable integrated into a wired connection between the ultrasound imaging device and the ultrasound probe.

In some embodiments, the ultrasound imaging device includes a light source configured to provide incident light to the optical fiber cable, wherein the optical fiber cable includes a plurality of reflective gratings disposed along a length of the optical fiber cable, and wherein each of the plurality of reflective gratings are configured to reflect light with different specific spectral widths to provide distributed measurements in accordance with strain applied to the optical fiber cable.

In some embodiments, the logic of the ultrasound imaging device, when executed by the processor, performs operations including determining a physical state of the optical fiber cable based on the reflected light, converting the physical state of the optical fiber cable to coordinate data, and causing display of the alteration of the content displayed in accordance with the coordinate data. Additionally, the ultrasound imaging device may be configured to acquire the ultrasound probe movement-related data based on infrared tracking of movements of the ultrasound probe. In some embodiments, the ultrasound probe is configured to enable or disable detection of the ultrasound probe movement-related data in response to detection of either a gesture by a motion detection device or a voice command.

In some embodiments, the ultrasound imaging device is configured to acquire the ultrasound probe movement-related data by video tracking performed by a camera integrated into or coupled with the ultrasound imaging device.

In some embodiments, the ultrasound probe system includes an augmented reality device connected to the ultrasound probe and to the ultrasound imaging device, wherein the augmented reality device is configured to render ultrasound images to a user and to display the screen pointer.

In some embodiments, alteration of the content displayed on the display screen includes movement of a screen pointer in accordance of with the ultrasound probe movement-related data.

Embodiments of the disclosure are directed to a non-transitory computer readable storage medium having stored thereon logic, the logic being executable by one or more processors to perform operations including causing content to be displayed on a display screen, obtaining ultrasound probe movement-related data indicative of movements of an ultrasound probe, and displaying an alteration of content displayed on a display screen in accordance of with ultrasound probe movement-related data.

In some embodiments, the ultrasound probe movement-related data is obtained from at least one accelerometer integrated into the ultrasound probe. In other embodiments, the ultrasound probe movement-related data is obtained through an optical fiber cable. In embodiments, the ultrasound probe movement-related data is determined from reflected light received via the optical fiber cable, wherein the optical fiber cable includes a plurality of reflective gratings disposed along a length of the optical fiber cable, and wherein each of the plurality of reflective gratings are configured to receive incident light and reflect light with different specific spectral widths to provide distributed measurements in accordance with strain applied to the optical fiber cable. In some embodiments, the logic of the ultrasound imaging device, when executed by the one or more processors, performs further operations including determining a physical state of the optical fiber cable based on the reflected light, converting the physical state of the optical fiber cable to coordinate data, and causing display of the alteration of the content displayed in accordance with the coordinate data. In some embodiments, the ultrasound probe movement-related data is detected by one of a camera or an infrared sensor.

Other embodiments of the disclosure are directed to a method including causing content to be displayed on a display screen, obtaining ultrasound probe movement-related data indicative of movements of an ultrasound probe, and displaying an alteration of content displayed on a display screen in accordance of with ultrasound probe movement-related data. In some embodiments, the ultrasound probe movement-related data is obtained from at least one accelerometer integrated into the ultrasound probe, a camera, or an infrared sensor. In other embodiments, the ultrasound probe movement-related data is obtained through an optical fiber cable.

In some embodiments, the ultrasound probe movement-related data is determined from reflected light received via the optical fiber cable, wherein the optical fiber cable includes a plurality of reflective gratings disposed along a length of the optical fiber cable, and wherein each of the plurality of reflective gratings are configured to receive incident light and reflect light with different specific spectral widths to provide distributed measurements in accordance with strain applied to the optical fiber cable.

In some embodiments, the logic of the ultrasound imaging device, when executed by the one or more processors, performs operations including determining a physical state of the optical fiber cable based on the reflected light, converting the physical state of the optical fiber cable to coordinate data, and causing display of the alteration of the content displayed in accordance with the coordinate data These and other features of the concepts provided herein will become more apparent to those of skill in the art in view of the accompanying drawings and following description, which describe particular embodiments of such concepts in greater detail.

BRIEF DESCRIPTION OF DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which.

DETAILED DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

For clarity, it is to be understood that the word "distal" refers to a direction relatively closer to a patient on which a medical device is to be used as described herein, while the word "proximal" refers to a direction relatively further from the patient. Also, the words "including," "has," and "having," as used herein, including the claims, shall have the same meaning as the word "comprising."

The term "logic" may be representative of hardware, firmware or software that is configured to perform one or more functions. As hardware, the term logic may refer to or include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the term logic may refer to or include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical, or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic may be stored in persistent storage.

Lastly, in the following description, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, components, functions, steps or acts are in some way inherently mutually exclusive.

Unless defined otherwise, all technical and scientific terms used herein have the same meaning as commonly understood by those of ordinary skill in the art.

Embodiments disclosed herein are directed to an ultrasound probe system to be used for ultrasound imaging as well as for remote control of an ultrasound imaging device. The ultrasound probe system including, in some embodiments, a remote control capability is provided.

In one embodiment, an ultrasound probe may be used as a remote control capable of driving functionality of a medical computer/ultrasound system in accordance with sterile use. This enables a user such as a clinician to control the medical computer/ultrasound system from within the sterile field mid-procedure. In one embodiment, the ultrasound probe serves as a physical control for causing alteration of content display on a display screen, such as a physical control for a screen pointer of the medical computer/ultrasound system. The ultrasound probe is configured to determine its position and movement in order to use this information to control the medical computer/ultrasound system remotely. In one embodiment, the ultrasound probe may be wirelessly connected to the medical computer/ultrasound system.

In one embodiment, determination of positioning and movements of the ultrasound probe may be provided by integrated accelerometers. The ultrasound probe may include a fiber optic component such as a fiber optic probe. The ultrasound probe may also include camera tracking device, which may allow the medical computer/ultrasound system to track movements of the ultrasound probe by the camera integrated into the medical computer/ultrasound system. Additional tracking of movements may be implemented by an infrared (IR) tracking device.

The ultrasound probe system, according to the exemplary embodiments, may be primarily used for ultrasound imaging and analysis of ultrasound images displayed on a screen of an image processing device. As discussed above, the ultrasound probe may be used as means of sterile system control and operation by serving as a remote pointer device during ultrasound imaging procedures.

Figure 1:
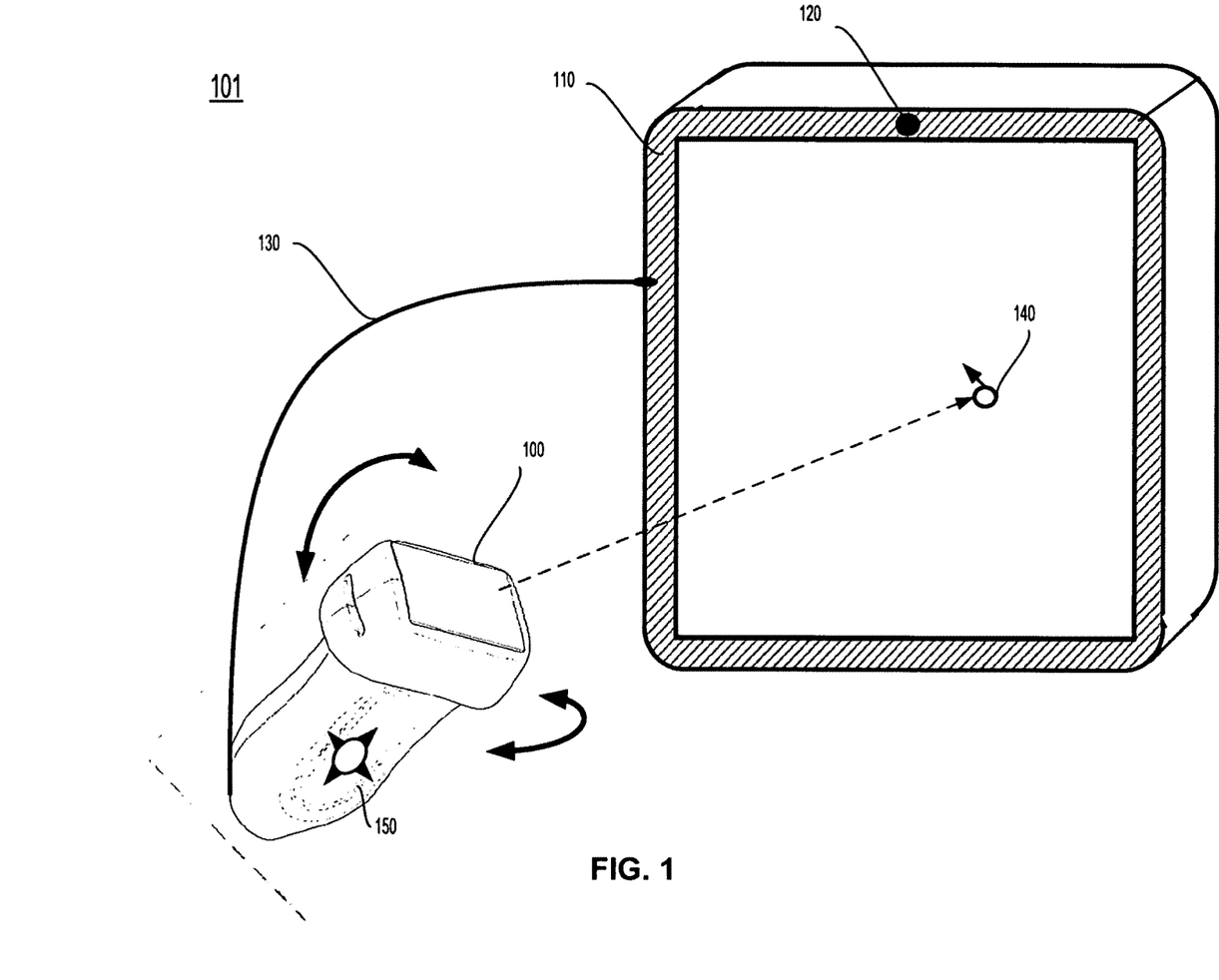
FIG. 1 provides a view of an ultrasound probe system used as a remote control for an image processing device from within a sterile field mid-procedure in accordance with some embodiments.

Referring to FIG. 1, a front view of an ultrasound probe system including a pressure measuring device is shown. The ultrasound probe system 101 includes an ultrasound probe 100 and an ultrasound image processing device 110. The ultrasound image processing device 110 may receive data and display visual feedback from the ultrasound probe 100 for rendering ultrasound visualization. Connection 130 represents a wired connection in this exemplary implementation. The ultrasound probe 100 may have control buttons 150 that may be used for ultrasound imaging and also for controlling of a screen pointer 140 remotely. As discussed above, the ultrasound probe 100 may be moved by a user such as a clinician in various directions as shown by arrows.

According to exemplary embodiments, the ultrasound probe 100 serves as a physical control for the screen pointer 140 of the ultrasound image processing device 110 (e.g., a medical computer/ultrasound system). Ultrasound probe movement-related data may be obtained by the ultrasound image processing device 110 in a variety of methods including, but not limited or restrict to, (1) a fiber optic probe 51 disposed within the ultrasound probe 100, (2) camera-tracking performed by a camera of or coupled to the ultrasound imaging device 110, such as the integrated camera 120, (3) one or more accelerometers of the ultrasound probe 100, and/or (4) infrared (IR) tracking performed by an IR tracking utility 52 of the ultrasound imaging device 110.

In some embodiments, the ultrasound probe 100 is configured to determine its position and movement in order to use this information to control the image processing device 110 remotely. However, in other embodiments, the ultrasound probe movement-related data is provided to the image processing device 110, which then determines the positioning and movement therefrom. Determination of positioning and movements of the ultrasound probe 100 may be provided by integrated accelerometers.

In a first set of embodiments, the ultrasound probe 100 includes a fiber optic probe 51, such as a shape sensing optical fiber cable, that is disposed within the ultrasound probe 100 and detect movement of the ultrasound probe 100 via a plurality of sensors disposed longitudinally along the optical fiber cable. Each of the plurality of sensors may operate as a reflective grating such as a fiber Bragg grating (FBG), namely an intrinsic sensor corresponding to a permanent, periodic refractive index change inscribed into a core fiber of the optical fiber cable. An optical fiber cable that includes a plurality of core fibers may be referred to as a "multi-core optical fiber cable." Each sensor operates as a light reflective mirror for a specific spectral width (e.g., a specific wavelength or specific range of wavelengths). As a result, as broadband incident light is supplied by an optical light source and propagates through a core fiber, upon reaching a first sensor of the distributed array of sensors for that core fiber, light of a prescribed spectral width associated with the first sensor is reflected back to an optical receiver within the image processing device 110, including a display and the optical light source. The remaining spectrum of the incident light continues propagation through the core fiber toward a distal end of the optical fiber cable (e.g., the ultrasound probe 100). The remaining spectrum of the incident light may encounter other sensors from the distributed array of sensors, where each of these sensors is fabricated to reflect light with different specific spectral widths to provide distributed measurements.

As a result, the reflected light returns information that allows for a determination of the physical state of the optical fiber cable based on wavelength shifts measured from the returned, reflected light. In particular, strain (e.g., compression or tension) applied to the optical fiber cable results in wavelength shifts associated with the returned, reflected light. As the ultrasound probe 110 is moved by the operator, the gratings of the optical fiber cable experience different types and degree of strain.

For example, with respect to a multi-core optical fiber cable, in response to angular (e.g., radial) movement of the ultrasound probe 100 in the left-veering direction, a first core fiber of the multi-core optical fiber cable with the shortest radius during movement (e.g., core fiber closest to a direction of angular change) would exhibit compression (e.g., forces to shorten length). At the same time, a second core fiber with the longest radius during movement (e.g., core fiber furthest from the direction of angular change) would exhibit tension (e.g., forces to increase length). As these forces are different and unequal, the reflected light from reflective gratings associated with the core fibers will exhibit different changes in wavelength. The differences in wavelength shift of the reflected light signals can be used to extrapolate the physical configuration of the wired connection 130 and the ultrasound probe 100 by determining the degrees of wavelength change caused by compression/tension for each of the core fibers in comparison to the wavelength of a center, reference core fiber that is located along a center axis of the multi-core optical fiber cable. These degrees of wavelength change may be used to extrapolate the physical state (e.g., positioning, movement, orientation, etc.) of the ultrasound probe 100.

In a second set of embodiments, the ultrasound imaging device 110 may include or be coupled to a camera, such as the integrated camera 120 for video tracking of the movements of the ultrasound probe 100 to produce the movement-related data that is converted into movements of the screen pointer 140. In particular, logic of the ultrasound image processing device 110 converts the tracked movements of the ultrasound probe 100 into coordinate data that, in turn, is utilized to move the screen pointer 140 based on the movements of the ultrasound probe 100.

In a third set of embodiments, the ultrasound probe 100 includes one or more accelerometers 49 integrated therein. Upon activation, the accelerometers 49 capture ultraSound probe movement-related data, which may then be provided to the ultrasound imaging device 110 to be converted into movements of the screen pointer 140.

In a fourth set of embodiments, the ultrasound imaging device 110 may include or be coupled to an IR tracking utility 52 (such as a pyroelectric IR sensor) that, upon activation, is configured to obtain ultrasound probe movement-related data by sensing heat emitted by the ultrasound probe 100. The logic 306 of the image processing device 110 may be configured to convert the sensed heat to ultrasound probe movement-related data, which is converted to screen coordinate data. The logic 306 may then cause movement of the screen pointer 140 in accordance with the ultrasound probe movement-related data.

In each of the sets of embodiments described above, logic 306 of the ultrasound image processing device 110 converts the tracked movements of the ultrasound probe 100 into coordinate data that, in turn, is utilized to move the screen pointer 140 based on the movements of the ultrasound probe 100. It should also be understood that any of the sets of embodiments may be combined such that the combined tracked movements may be converted into coordinate data.

Additionally, the processor 30 of the ultrasound probe 100 may provide the movement-related data generated by detection of gestures by a motion detection device (not shown) integrated into the ultrasound probe 100 to control the functionality of the screen pointer 140. In some embodiments, the processor of the ultrasound probe 100 may be configured to control the functionality of the screen pointer 140 by voice commands processed by a voice recognition utility 53 integrated into the ultrasound probe 100. For example, the voice recognition utility 53 integrated into the ultrasound probe 100 may detect voice commands that enable or disable the functionality of the ultrasound probe 100 to serve as a physical control of the screen pointer 140.

Figure 2:
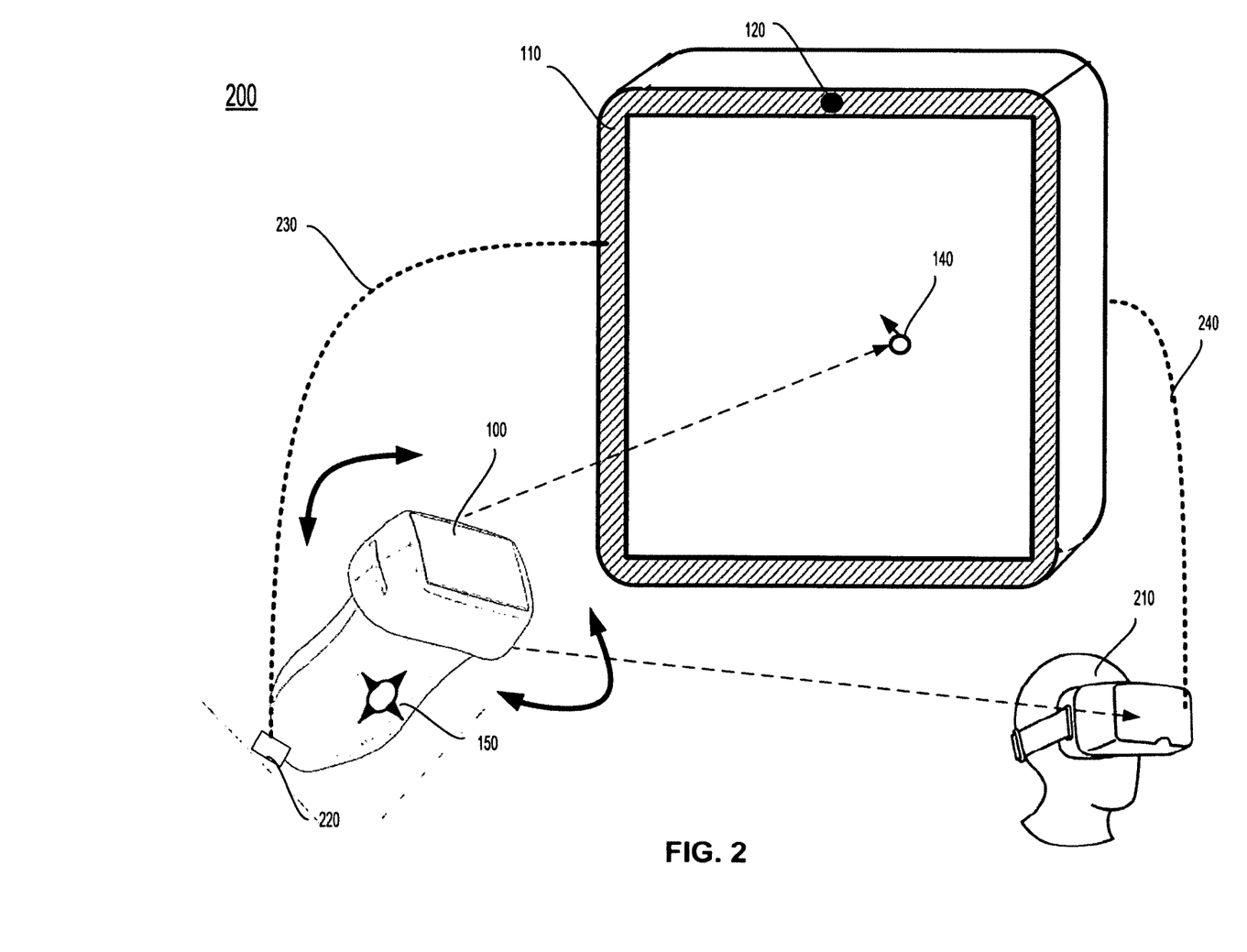
FIG. 2 provides a view of an ultrasound probe system used as a remote control for an image processing device and an augmented reality device mid-procedure in accordance with some embodiments.

Referring to FIG. 2, a view of an ultrasound probe system used as a remote control for an image processing device and a virtual reality or augmented reality device mid-procedure is shown. As discussed above with reference to FIG. 1, the ultrasound system includes the ultrasound probe 100 connected to the ultrasound image processing device 110. The ultrasound image processing device 110 may be a special-purpose ultrasound computer system. The ultrasound image processing device 110 may also receive and display a visual feedback from the ultrasound probe 100 for rendering ultrasound visualization. Connection 230 represents a wireless connection in this exemplary implementation. A wireless card or utility is shown as 220. The ultrasound probe 100 may have control buttons 150 that may be used for ultrasound imaging and also for controlling a screen pointer 140 remotely. As discussed above, the ultrasound probe 100 may be moved by a user such as a clinician in various directions as shown by arrows.

The ultrasound probe 100 may serve as a physical control for the screen pointer 140 of the ultrasound imaging system (e.g., a medical computer/ultrasound system) 110. The ultrasound probe 100 may be configured to determine its position and movement and pass the ultrasound probe movement-related data to the ultrasound image processing device 110 to be converted into movements of the screen pointer 140.

In some embodiments, the processor of the ultrasound probe 100 may be configured to control a functionality of the screen pointer 140 by providing the ultrasound probe movement-related data generated by an infrared tracking of movements of the ultrasound probe. The processor of the ultrasound probe 100 may provide the movement-related data generated by detection of gestures by a motion detection device (not shown) integrated into the ultrasound probe 100 to control the functionality of the screen pointer 140. In some embodiments, the processor of the ultrasound probe 100 may be configured to control the functionality of the screen pointer 140 by voice commands processed by a voice recognition utility 53 integrated into the ultrasound probe. The ultrasound image processing device 110 may use an integrated camera 120 for video tracking of the movements of the ultrasound probe 100 to produce the movement-related data that is converted into movements of the screen pointer 140.

The ultrasound system 200 depicted in FIG. 2 includes the ultrasound probe 100 that is wirelessly connected to the ultrasound imaging device 110 to render ultrasound images on the screen of the ultrasound imaging device 100. The ultrasound system 200 also includes an augmented reality device 210 (which may also be a virtual reality device) coupled to the ultrasound probe via a wireless or wired connection and to the ultrasound imaging device 110 as shown by connection 240. The augmented reality device 210 is configured to render ultrasound images to a user and to display the screen pointer 140 controlled by the ultrasound probe 100.

Figure 3:
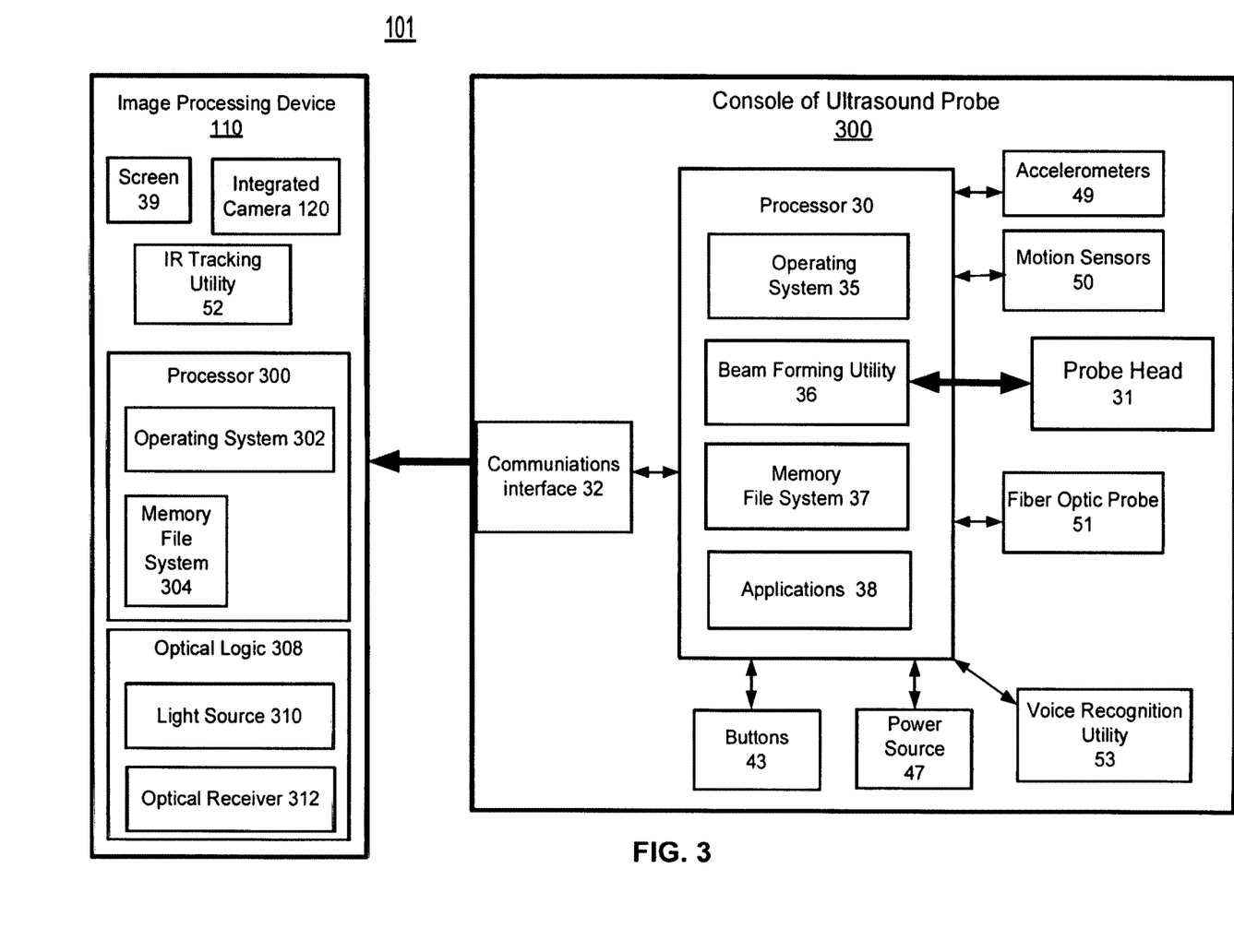
FIG. 3 provides a block diagram of an ultrasound probe system including a n ultrasound probe connected to an image processing device in accordance with some embodiments.

FIG. 3 shows a block diagram of an ultrasound probe system 110 including a console connected to an image processing device. The ultrasound probe 100 (depicted in FIGS. 1 and 2) includes an ultrasound probe head 31. In some embodiments, the ultrasound probe 100 may include therein a processor 30 for governing system functionality by employment of a general-purpose operating system 35, memory with a file system 37 (e.g., non-transitory, computer-readable medium), and logic or applications 38 that may be stored in the memory 37 and executed by the processor 30. Some of the logic or applications 38 may provide an application programmable interfaces (APIs) to allow a user (i.e., a clinician or a doctor) to control a screen pointer on a screen 39 of the image processing device 110. A beam forming utility 36, including suitable circuitry is also controlled by the processor 30 to enable signals to be produced, received, and processed. For example, the beam forming utility 36 may produce some signals that may be received by the probe head 31. The probe head 31 passes these signals into an area of a patient and receives some reflected signals. The beam forming utility 36 may process the reflected ultrasonic signals converted into electric signals by the probe head 31 and may convert the electric signals into image data. The image data is passed on to the image processing device 110 to be displayed to a user (i.e., a clinician) on the screen 39. Buttons 43 including a power button and control buttons are provided for operation of the ultrasound probe. However, in some embodiments, the ultrasound probe 100 need not include all components shown, such as, for example, the operating system 35.

In some embodiments, the ultrasound probe is configured to determine its position and movement of the ultrasound probe 100 in order to use this information to control the image processing device 110 remotely. Determination of positioning and movements of the ultrasound probe 100 may be provided by integrated accelerometers 49. A processor 30 of the ultrasound probe may be configured to acquire ultrasound probe movement-related data from at least one accelerometer 49.

The ultrasound probe 100 may pass the ultrasound probe movement-related data to the image processing device 110 to be converted into movements of the screen pointer 140. In one embodiment, the processor 30 of the ultrasound probe 100 may be configured to pass the ultrasound probe movement-related data to the image processing device 110 by using a fiber optic probe 51 integrated into the ultrasound probe 100 and connected to the ultrasound probe 100. The processor 30 may provide the movement-related data generated by detection of gestures by motion sensors 50 integrated into the ultrasound probe 100 and connected to the processor 30 to control the functionality of the screen pointer 140. In some embodiments, the processor of the ultrasound probe 100 may be configured to control the functionality of the screen pointer 140 by voice commands processed by a voice recognition utility 53 integrated into the ultrasound probe 100. Note that the ultrasound probe 100 can include different, fewer, or more components than those listed here, including those components that enable the ultrasound probe to operate in a wireless networked manner with other local or remote image processing devices. The ultrasound probe 100 may be also connected to a remote Electronic Health Records (EHR) system.

Additionally, the image processing device 110 is shown to include a screen 39, the IR tracking utility 52, a processor 300, and the optional integrated camera 120. The processor 300 may include an operating system (or may execute an operating system stored on a memory file system 304) and optical logic 308. The memory file system 304 may also have stored thereon logic or applications 306. As discussed above, in some embodiments, the image processing device 110 may obtain ultrasound probe movement-related data using the IR tracking utility 52 (such as a pyroelectric IR sensor). The logic 306 may be configured to convert the ultrasound probe movement-related data to screen coordinate data. The logic 306 may then cause movement of the screen pointer 140 in accordance with the ultrasound probe movement-related data. The optical logic 308 includes a light source 310 and an optical receiver 312.

The light source 310 is configured to transmit the broadband incident light for propagation over the optical fiber cable. In one embodiment, the light source 310 is a tunable swept laser, although other suitable light source can also be employed in addition to a laser, including semi-coherent light sources, LED light sources, etc. The optical receiver 312 (e.g., a photodetector such as a positive-intrinsic-negative "PIN" photodiode, avalanche photodiode, etc.) is configured to: (i) receive returned optical signals, namely reflected light signals received from optical fiber-based reflective gratings (sensors) fabricated within each of the core fibers of the optical fiber cable deployed within wired connection 130 and the ultrasound probe 100, and (ii) translate the reflected light signals into reflection data, namely data in the form of electrical signals representative of the reflected light signals including wavelength shifts caused by strain.

Having a system that not only provides for ultrasound imaging, but provides for pointer remote control capability to enable a single user to control an image processing device from within a sterile field mid-procedure advantageously reduces a risk of spreading infections.

What is claimed is:

1. An ultrasound system, comprising:
   an ultrasound probe having a fiber optic component disposed therein; and
   an ultrasound imaging device operatively connected to the ultrasound probe via a wired connection such that an optical fiber cable extends from the fiber optic component within the ultrasound probe longitudinally along the wired connection to the ultrasound imaging device, the ultrasound imaging device including a display screen, a processor and non-transitory computer-readable medium having stored thereon logic, wherein the logic of the ultrasound imaging device, upon execution by the processor, causes operations including:
   receiving reflected light signals from gratings distributed along a length of the optical fiber cable and the fiber optic component,
   determining a physical state of the optical fiber cable and the fiber optic component based on the reflected light signals,
   converting the physical state of the optical fiber cable and the fiber optic component to ultrasound probe movement-related data, and
   altering content displayed on the display screen in accordance with the ultrasound probe movement-related data, wherein altering the content displayed on the display screen includes movement of a screen pointer in accordance with the ultrasound probe movement-related data, wherein enabling or disabling detection of the ultrasound probe movement-related data is performed in response to detection of a voice command.

2. The ultrasound system of claim 1, wherein the ultrasound probe enables a user to control the ultrasound imaging device from within a sterile field.

3. The ultrasound system of claim 1, wherein the ultrasound imaging device is configured to acquire the ultrasound probe movement-related data from at least one accelerometer integrated into the ultrasound probe.

4. The ultrasound system of claim 1, wherein the ultrasound imaging device includes a light source configured to provide incident light to the optical fiber cable, wherein the optical fiber cable includes a plurality of reflective gratings disposed along a length of the optical fiber cable, and wherein each of the plurality of reflective gratings are configured to reflect light with different specific spectral widths to provide distributed measurements in accordance with strain applied to the optical fiber cable.

5. The ultrasound system of claim 4, wherein the logic of the ultrasound imaging device, when executed by the processor, performs further operations including:
   determining a physical state of the optical fiber cable based on the reflected light,
   converting the physical state of the optical fiber cable to coordinate data, and
   causing display altered content in accordance with the coordinate data.

6. The ultrasound system of claim 1, wherein the ultrasound imaging device is configured to acquire the ultrasound probe movement-related data based on infrared tracking of movements of the ultrasound probe.

7. The ultrasound system of claim 1, wherein the ultrasound probe is configured to enable or disable detection of the ultrasound probe movement-related data in response to detection of the voice command.

8. The ultrasound system of claim 1, wherein the ultrasound imaging device is configured to acquire the ultrasound probe movement-related data by video tracking performed by a camera integrated into or coupled with the ultrasound imaging device.

9. The ultrasound system of claim 1, further comprising an augmented reality device operatively connected to the ultrasound probe and to the ultrasound imaging device, wherein the augmented reality device is configured to render ultrasound images to a user.

10. A non-transitory computer readable storage medium having stored thereon logic, the logic being executable by one or more processors to perform operations comprising:
    causing content to be displayed on a display screen of an ultrasound imaging device that includes display of a screen pointer;
    obtaining ultrasound probe movement-related data indicative of movements of an ultrasound probe,
        wherein the ultrasound probe includes a fiber optic component disposed therein, and
        wherein the ultrasound imaging device is operatively connected to the ultrasound probe via a wired connection such that an optical fiber cable extends from the fiber optic component within the ultrasound probe longitudinally along the wired connection to the ultrasound imaging device;
    receiving reflected light signals from gratings distributed along a length of the optical fiber cable and the fiber optic component;
    determining a physical state of the optical fiber cable and the fiber optic component based on the reflected light signals;
    converting the physical state of the optical fiber cable and the fiber optic component to ultrasound probe movement-related data; and
    displaying an alteration of content displayed on the display screen in accordance with ultrasound probe movement-related data, wherein altering the content displayed on the display screen includes movement of the screen pointer in accordance with the ultrasound probe movement-related data, wherein enabling or disabling detection of the ultrasound probe movement-related data is performed in response to detection of a voice command.

11. The non-transitory, computer-readable storage medium of claim 10, wherein the ultrasound probe movement-related data is obtained from at least one accelerometer integrated into the ultrasound probe.

12. The non-transitory, computer-readable storage medium of claim 10, wherein the ultrasound probe movement-related data is obtained through an optical fiber cable.

13. The non-transitory, computer-readable storage medium of claim 12, wherein the ultrasound probe movement-related data is determined from reflected light received via the optical fiber cable, wherein the optical fiber cable includes a plurality of reflective gratings disposed along the length of the optical fiber cable, and wherein each of the plurality of reflective gratings are configured to receive incident light and reflect light with different specific spectral widths to provide distributed measurements in accordance with strain applied to the optical fiber cable.

14. The non-transitory, computer-readable storage medium of claim 12, wherein the logic of the ultrasound imaging device, when executed by the one or more processors, performs further operations comprising:
    determining the physical state of the optical fiber cable based on the reflected light signals;
    converting the physical state of the optical fiber cable to coordinate data; and
    causing display of the alteration of the content displayed in accordance with the coordinate data.

15. The non-transitory, computer-readable storage medium of claim 10, wherein the ultrasound probe movement-related data is detected by one of a camera or an infrared sensor.

16. The ultrasound system of claim 7, wherein the ultrasound probe includes a probe processor that performs probe operations including:
    detecting the voice command; and
    enabling detection of the ultrasound probe movement-related data in response to detecting the voice command.

17. The non-transitory, computer-readable storage medium of claim 10, wherein the ultrasound probe is configured to enable or disable detection of the ultrasound probe movement-related data in response to detection of the voice command.

18. The non-transitory, computer-readable storage medium of claim 17, wherein the ultrasound probe includes a probe processor that performs probe operations including:
    detecting the voice command; and
    enabling detection of the ultrasound probe movement-related data in response to detecting the voice command.

* * * * *